United States Patent [19]
Rice et al.

[11] Patent Number: 6,061,170
[45] Date of Patent: May 9, 2000

[54] DUAL FREQUENCY LASER AMPLIFIER ARRAY AND OPERATING METHOD THEREFOR

[75] Inventors: Robert R. Rice, Chesterfield; Mark S. Zediker, Florissant; Bartley C. Johnson, Clayton, all of Mo.

[73] Assignee: McDonnell Douglas Corporation, St. Louis, Mo.

[21] Appl. No.: 09/039,420

[22] Filed: Mar. 16, 1998

[51] Int. Cl.[7] .................................................. H01S 3/00
[52] U.S. Cl. ................................. 359/341; 372/6
[58] Field of Search ................................ 359/333, 346, 359/341; 372/6

[56] References Cited

U.S. PATENT DOCUMENTS

| | | | |
|---|---|---|---|
| 5,172,387 | 12/1992 | Fink | 372/68 |
| 5,182,759 | 1/1993 | Anthon et al. | 372/72 |
| 5,485,480 | 1/1996 | Kleinerman | 372/6 |
| 5,594,747 | 1/1997 | Ball | 372/31 |

*Primary Examiner*—Mark Hellner
*Attorney, Agent, or Firm*—Westerlund Powell, P.C.; Raymond H. J. Powell, Jr.; Robert A. Westerlund

[57] ABSTRACT

A dual frequency laser amplifier includes a beam generator for generating first and second source laser beams, and a co-doped optical fiber including first and second dopant ions having first and second gain bandwidths corresponding to the respective wavelengths of the first and second source laser beams for selectively forming first and second diffraction limited output laser beams responsive to the relative radiated power between the first and second source laser beams. A dual frequency laser oscillator and a method for generating the first and second output laser beams at any predetermined radiated power distribution are also described.

25 Claims, 10 Drawing Sheets

Er Feedback

Yb Feedback

Feedback to Both Ions

DUAL FREQUENCY LASER AMPLIFIER ARRAY AND OPERATING METHOD THEREFOR

BACKGROUND OF THE INVENTION

The present invention relates generally to dual frequency laser and laser array systems. More specifically, the present invention relates to dual frequency laser and laser array systems for selectively generating first and second frequency laser beams. Methods of operating the dual frequency laser and laser array systems are also disclosed.

It is generally known that the emission wavelength of a fiber optic laser amplifier or a fiber optic phased array source advantageously can be set by the wavelength of a master oscillator, provided that wavelength is within the gain bandwidth of the rare earth dopant in the fiber amplifier single mode core. Dopant ions commonly used in fiber amplifiers include Nd, Yb, Er, Pr, Tm and Ho. It will be appreciated that the gain bandwidth for all of these dopants is from a few to several tens of nanometers wide, e.g., from 1050 nm to 1080 nm for Nd and from 1530 nm to 1565 nm for Er. It would be highly advantageous to be able to operate a fiber optic laser amplifier at more than one of the emission wavelength bands associated with these rare earth dopants. It would be particularly advantageous to be able to operate a fiber optic laser amplifier constructed, at least in part, using a co-doped optical fiber, at more than one of the emission wavelength bands associated with these rare earth dopants.

In order to generate the desired first and second laser beams at first and second frequencies, respectively, several criteria must be satisfied. First, a laser cavity or optical fiber capable of producing the required lasing action must be available. As will be discussed in greater detail below, co-doped optical fibers, e.g., Yb:Er doped optical fibers, have been produced but have been employed in markedly different systems. Second, the laser cavity or optical fiber (array) must be operated under appropriate drive conditions.

Co-doped amplifying media are generally known. For example, U.S. Pat. No. 4,701,928 discloses a diode laser pumped co-doped laser having a YAG host crystal doped with both Ho and Er. In this patent, the Er functions as an absorber ion and the Ho as the laser ion, whereby the Er absorber ion absorbs the pump radiation provided by one or more laser diodes and transfers the absorbed radiation to the Ho laser ion for inverting the population of the desired energy transition levels to produce an eyesafe output beam. U.S. Pat. Nos. 5,172,387 and 5,182,759 disclose variants of this operating principle. An additional variant is disclosed in U.S. Pat. No. 5,566,196, wherein singly doped optical fibers are bundled in close proximity to one another, allowing interaction between the differently doped optical fibers. It should be mentioned that all of these patents are incorporated herein by reference.

Co-doped optical fibers wherein two of the dopants have been implanted into a single mode core of an amplifier fiber are also known. For example, Yb:Er co-doped optical fibers have actually been produced, as disclosed in U.S. Pat. No. 5,594,747, which patent will be discussed in greater detail below. It will be appreciated that it is difficult to pump Er fibers because absorption is generally weak across the spectrum except in a narrow band centered either around 980 nm, for which pump diodes are neither adequately developed nor readily available, or around 1480 nm, for which adequate laser pump diodes are also not available. In contrast, excellent pump diodes are available in the wavelength region of 915 nm to 940 nm for pumping Yb doped fiber amplifiers, which normally provide gain in the range of 1030 nm to 1100 nm, i.e., the 1 $\mu$m band. Efficient transfer of energy has been obtained from excited Yb to Er ions, making it possible to pump Yb:Er fibers at 925 nm and produce gain at the 1.5 $\mu$m band.

U.S. Pat. No. 5,594,737, which is incorporated herein by reference, discloses a dual-wavelength pumped low noise fiber laser including a fiber laser 10 comprising a pair of Bragg gratings 14, 16 at opposite ends of a fiber laser cavity 18 which is co-doped with two rare-earth dopants, $Er^{+3}$ and $Yb^{+3}$, which allows lasing at a lasing wavelength $\lambda_L$. A first pump signal 20 at a first wavelength $\lambda_{P1}$ efficiently pumps the Yb to the excited state and the Yb energy is transitioned to the Er atoms which ultimately lase at the desire lasing frequency. Simultaneously, a second pump signal 52 directly pumps the Er at a different wavelength $\lambda_{P2}$, which populates the lasing transition more quickly.

As shown in FIG. 1, a conventional dual-wavelength pumped low noise fiber laser 10 includes a fiber laser 12 having Bragg gratings 14,16 embedded in the core of the fiber a predetermined distance apart. Between the gratings 14,16 is a region of fiber 18 doped with two predetermined rare-earth dopants (or gain or active medium), e.g., Erbium ($Er^{+3}$) and Ytterbium ($Yb^{+3}$), which acts as a laser cavity 18. The gratings 14,16 have a grating spacing which provides a peak reflectivity at a lasing wavelength $\lambda_L$, e.g., about 1550 nanometers, for an erbium-doped cavity, of the fiber laser. The gratings 14,16 and the doped fiber cavity 18 make up the three fundamental elements of a typical fiber laser.

Furthermore, the fiber laser 12 is pumped by a first input pump light 20 from a first pump light source 22, e.g., a laser diode. The pump light 20 has a first pumping wavelength $\lambda_{P1}$, e.g., 980 nanometers. The pump light 20 travels along a fiber 24 to a port 26 of a known wavelength division multiplexer (WDM) 28 which provides wavelength sensitive coupling of light. The light 20 is coupled to a port 30 of the WDM 28 and propagates along an optical fiber 32 to the fiber laser 12. The pump light 20 passes through the grating 16 and enters the laser cavity 12. The pump wavelength $\lambda_{P1}$, primarily excites the Ytterbium (Yb) portion of the gain medium of the cavity 18 to a predetermined energy level. The energy of the excited Yb atoms transitions to the Erbium (Er) atoms and the Er emits photons at the lasing wavelength $\lambda_L$, as indicated by a line 36. The light 36 at the lasing wavelength $\lambda_L$ that passes through the back grating 16 exits the laser as output laser light 40 along the fiber 32. Moreover, a predetermined amount of the cavity light 36 reflects off the grating 16, as indicated by a line 44. The light 44 is incident on the grating 14 which reflects the aforementioned predetermined amount of light at the lasing wavelength $\lambda_L$ and passes a portion of the light 46 out of the cavity 18 at the lasing wavelength $\lambda_L$ along a fiber 48.

For lasing to be sustained, the lasing condition (or lasing threshold) must be met, i.e., the round trip small signal gain times the round trip loss for light within the cavity is greater than or equal to one. This is accomplished by setting the amount of cavity gain, the length of the cavity, and the reflectivity of the gratings so as to meet this condition. If the product of these factors is greater than one, laser beam power will build up to the saturation gain limit of the amplifier. It will be understood that while the length of the cavity is not critical, for single longitudinal mode operation, the laser cavity should be as short as possible.

The laser 12 is also pumped by a second optical signal 52 from an optical pump source 54, e.g., a laser diode, having a second pump wavelength $\lambda_{P2}$, e.g., 1480 nm. The source 54 provides the second pump signal 52 along a fiber 56 to a port 58 of a WDM 60, which is similar to the WDM 28. The WDM 60 couples the light 52 to a port 62 of the WDM which is coupled to the fiber 48. The pump light 52 passes through the grating 14 and enters the cavity 18. The pump light 52 excites the Er portion of the Yb:Er gain medium and allows the Er to emit lasing light at the lasing wavelength $\lambda_L$ e.g., 1550 nm). As discussed hereinbefore, light within the cavity at $\lambda_L$ resonates in the cavity between the reflectors 14,16 and a portion is allowed to pass as output light signals 46,40, respectively, from the laser.

The light 46 enters the port 62 of the WDM 60 which couples the light 46 at the lasing wavelength $\lambda_L$ to a port 64 of the WDM 60. The light 46 travels along an optical fiber 66 and is fed to an optical detector 68 which detects the light 46 and provides an electrical signal on a line 70 indicative thereof. The line 70 is fed to a control circuit 72 which provides an electrical signal on a line 74 to the pump source 54. The control circuit 72 contains known electronic control components (e.g., op-amps, etc.) designed to provide proportional-integral-differential (PID) closed loop control of the intensity of the output light from the laser. Alternatively, the control circuit 72 can be replaced by a known computer with comparable known control software.

The light 40 that exits the fiber laser 12 includes both light at the lasing wavelength $\lambda_L$ and light at the pump wavelength $\lambda_{P2}$ that was not absorbed by the gain medium in the fiber laser 12. The light 40 is fed to the port 30 of the WDM 28 along the fiber 32. The WDM 28 couples the light 40 to a port 76 of the WDM 28 and exits the WDM on a fiber 78, and is the output light from the dual-wavelength pumped fiber laser 10.

The light 40 from the WDM 28 passes through an optical isolator 82, which passes light in only one direction, and is incident on a fiber optic amplifier 84. The amplifier 84 comprises an optical fiber which is doped with a rare-earth dopant (or gain medium), e.g., erbium, and provides an output light 86 which is amplified at the lasing wavelength $\lambda_L$ from that of the input signal 40. The light 86 passes though an output isolator 88, which passes light in only one direction, and then travels along a fiber 90 and ultimately exits the fiber 90 as indicated by a line 92. The amplifier 84 uses the remaining pump energy at the second pump wavelength $\lambda_{P2}$ (that was not absorbed by the gain medium of the fiber laser 12) to excite the amplifier gain medium to a level that allows the stimulated emission of photons at the lasing wavelength $\lambda_L$ by the amplifier 84. It will be appreciated that the isolator 82 prevents light 94 emitted by the amplifier 84, toward the WDM 28, from entering and disrupting the operation of the fiber laser 12. Moreover, the isolator 88 prevents external optical signals from entering and disrupting the operation of the amplifier 84.

In short, U.S. Pat. No. 5,594,747 discloses a system capable of operation only at the 1550 nm Er wavelength by pumping at the broad Yb absorption bands with subsequent energy transfer by cross relaxation. The disclosed system is incapable of operating at other predetermined wavelengths, i.e., is incapable of satisfying the second criteria.

What is needed is a dual laser amplifier system and operating method therefor capable of selectively generating at least two output laser beams at predetermined first and second wavelengths. Moreover, what is needed is a dual frequency laser system and operating method therefor capable of operating as either an amplifier on an oscillator. It would be highly desirable to include provisions in the dual laser amplifier system and operating method therefor whereby the system and corresponding operating method could be operated only at eyesafe wavelengths during training exercises.

SUMMARY OF THE INVENTION

Based on the above and foregoing, it can be appreciated that there presently exists a need in the art for a dual frequency optical fiber amplifier and/or oscillator and corresponding operating methods which overcome the above-described deficiencies. The present invention was motivated by a desire to overcome the drawbacks and shortcomings of the presently available technology, and thereby fulfill this need in the art.

It will be appreciated that an efficient, high power, co-doped optical fiber amplifier for dual band operation is superficially similar in construction to prior art doubly doped fiber amplifiers, but profoundly different both in operation and in application. Conventional co-doped optical fibers are employed to facilitate convenient pumping of optical fibers for low or higher power operation at the target ion emission wavelength(s). In contrast, the present invention employs both the absorber or pump ion and target ion emission wavelengths either interchangeably or jointly to thereby facilitate a wide range of applications. In an exemplary case, a multi-band, multi-functional laser system capable of operating at both 1 $\mu$m and 1.5 $\mu$m wavelengths is preferred, although other operating wavelengths are possible. It should be mentioned that the operating capability according to the present invention is not readily achieved with doubly doped laser host crystals or glass laser rods, such as discussed above, and hence represents one competitive advantage of optical fiber laser systems over short cavity laser systems.

The preferred embodiment according to the present invention is a power-scalable optical fiber laser amplifier array that permits generation of any combination of first and second wavelength laser beams. Advantageously, these two laser beams can be selectively combined or manipulated to produce other desired laser beams at predetermined wavelengths.

One object according to the present invention is to provide an optical fiber laser amplifier array or laser oscillator for generating first and second laser beams of respectively different wavelengths.

Another object according to the present invention is to provide an optical fiber laser amplifier array or laser oscillator for generating first and second output laser beams of respectively different wavelengths responsive to first and second source laser beams. Preferably, the first and second source laser beams are generated by respective master oscillators.

Yet another object according to the present invention is to provide an optical fiber laser amplifier array or laser oscillator for generating an output laser beam at a wavelength different than those of first and second source laser beams. Preferably, the first and second source laser beams are generated by respective master oscillators.

Still another object according to the present invention is to provide an optical fiber laser amplifier array or laser oscillator for generating first and output second laser beams of respectively different wavelengths and power levels responsive to selectively applied first and second source laser beams. Preferably, one of the first and second output laser beams advantageously can be an eyesafe output laser beam.

A still further object according to the present invention is to provide a safety mechanism for an optical fiber laser amplifier array or laser oscillator generating first and output second laser beams of respectively different wavelengths and power levels, wherein only one of the first and second output laser beams advantageously is an eyesafe output laser beam, responsive to selectively applied first and second source laser beams to permit generation of only the eyesafe output laser beam.

Another object according to the present invention is to provide a scalable optical fiber laser amplifier array or laser oscillator for generating first and output second laser beams of respectively different wavelengths responsive to first and second source laser beams.

Yet another object according to the present invention is to provide a scalable optical fiber laser amplifier array for generating first and output second laser beams of respectively different wavelengths responsive to first and second source laser beams wherein individual amplifier stage components can be readily distributed throughout an enclosing structure. According to one preferred embodiment, the structure is a vehicle.

Still another object according to the present invention is to provide an optical fiber laser amplifier array permitting a choice between several wavelength windows while retaining a common architecture.

A still further object according to the present invention is to provide an optical fiber laser amplifier array having unprecedented packaging benefits as compared to conventional diode pumped $TEM_{00}$ mode lasers.

Yet another object according to the present invention is to provide an optical fiber laser amplifier array which can be fabricated at a low cost. Major cost benefits are achieved by leveraging on fiber optic amplifier development in the telecommunications field.

These and other objects, features and advantages according to the present invention are provided by a dual frequency laser amplifier including a beam generator for generating first and second source laser beams, and a co-doped optical fiber including first and second ions having first and second gain bandwidths corresponding to the respective wavelengths of the first and second source laser beams for selectively forming first and second diffraction limited output laser beams responsive to the relative radiated power between the first and second source laser beams.

According to one aspect of the present invention, the beam generator includes a first master oscillator for producing the first source laser beam at the first wavelength, a second master oscillator for producing the second source laser beam at the second wavelength, and a wavelength combiner for combining and applying the first and second source laser beams to the co-doped optical fiber. Advantageously, the co-doped optical fiber can include a plurality of co-doped optical fiber sections disposed in an array. The output of the co-doped optical fiber can be applied to a frequency doubler, in an exemplary case, for doubling the frequency of the selected one of the first and second diffraction limited output laser beams so as to produce a corresponding frequency doubled diffraction limited output laser beam.

According to another aspect of the present invention, the co-doped optical fiber includes a co-doped single mode optical fiber core, where at least two dopants included in the optical fiber core are selected from a group consisting of Nd, Yb, Er, Pr, Tm, and Ho. Preferably, the co-doped optical fiber is one of a Yb:Er optical fiber and a Yb:Pr optical fiber. Other dopants advantageously can include appropriate divalent ions producing color centers and disbursed semiconductor nanocrystals.

These and other objects, features and advantages according to the present invention are provided by a dual frequency laser amplifier includes:

a first device for generating a first source laser beam at a first wavelength;

a second device for generating a second source laser beam at a second frequency;

a third device receiving the first and the second source laser beams for combining the first and second source laser beams to thereby generate a combined laser beam;

a fourth device operatively coupled to the third device for generating N first source laser beams and for generating N second source laser beams responsive to the combined laser beam;

a fifth device for amplifying the power level of each of the N first source laser beams and the N second source laser beams to thereby produce N first amplified laser beams and N second amplified laser beams, the fifth device including at least one section of co-doped optical fiber; and a sixth device for combining the first and second N amplified laser beams to thereby produce a diffraction limited output laser beam, wherein the radiated power distribution between the first and the second wavelengths in the diffraction limited output laser beam reflects the relative radiated power between the first and the second source laser beams;

where N is an integer greater than 1.

These and other objects, features and advantages according to the present invention are provided by a method for operating a dual frequency laser amplifier having a beam generator for generating first and second source laser beams, and a co-doped optical fiber including first and second ions having first and second gain bandwidths corresponding to the respective wavelengths of the first and second source laser beams for selectively forming first and second diffraction limited output laser beams. Advantageously, the method includes steps for:

applying only the first source laser beams to the co-doped optical fiber to thereby generate only the first diffraction limited laser beam;

applying only the second source laser beams to the co-doped optical fiber to thereby generate only the second diffraction limited laser beam; and simultaneously applying the first and the second source laser beams to the co-doped optical fiber to thereby simultaneously generate the first and second diffraction limited output laser beams, wherein the radiated power distribution between the first and second diffraction limited output laser beams is determined by the relative radiated power ratio of the first and second source laser beams.

According to one aspect of the present invention, the method also includes a step for doubling the frequency the first and second diffraction limited output laser beams to thereby produce a frequency doubled diffraction limited output laser beam. According to another aspect of the present invention, the method also includes a step for arithmetically processing the first and second diffraction limited output laser beams to thereby generate a resultant laser beam having a wavelength different from that of both the first and the second wavelengths.

These and other objects, features and advantages according to the present invention are provided by a dual frequency laser oscillator, including a beam generator for generating first and second source laser beams, and a co-doped optical fiber including first and second ions having first and second gain bandwidths corresponding to the respective wavelengths of the first and second source laser beams for selectively forming first and second diffraction limited output laser beams responsive to the relative radiated power between the first and second source laser beams, wherein the beam generator and the co-doped optical fiber are both feedforward and feedback coupled to one another.

These and other objects, features and advantages of the invention are disclosed in or will be apparent from the following description of preferred embodiments.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIGS. 3A through 3C illustrate alternative preferred configurations of the selected optical elements within the optical fiber laser amplifier array as illustrated in FIG. 2 while

DETAILED DESCRIPTION OF THE PREFERRED EMBODIMENTS

As will be discussed in greater detail below, a master oscillator -phased power amplifier array (MO-PPAA) system illustrated in FIG. 2 employs a master oscillator to generate a signal at a low power level that is coupled into an optical fiber. The signal, which must be within the gain band of the single rare earth dopant used in the system, is amplified and split among many identical fiber optic power amplifiers. Each power amplifier stage amplifies the signal to a high level and delivers it to a summing aperture with appropriate beam forming optics. Preferably, the phase of the signal from each beam line is individually controlled to form a diffraction limited beam from the array. In will be appreciated that the master oscillator defines the wavelength and waveform of the signal amplified and subsequently radiated by the system, subject to the wavelength constraints mentioned below.

In contrast, the preferred embodiments according to the present invention employ two (or more) rare earth dopants incorporated into the core of the fiber amplifier to thereby enable operation at either one or all of the gain bands associated with each dopant. While doubly doped fiber amplifiers are not new per se, the use of co-doped optical fibers in an optical fiber laser amplifier array to thereby enable the dual frequency operation of a high power amplifier, and especially a coherent phased array of fiber amplifiers, has not been reported. Moreover, inasmuch as a dual frequency laser amplifier array according to the present invention is novel, the combination of the dual frequency laser amplifier array with a known frequency doubler, either within the final power amplifier stage or downstream of the final power amplifier stage, has never before been suggested or proposed. Furthermore, inasmuch as a dual frequency laser amplifier array according to the present invention is novel, the alternative embodiment of a dual frequency laser oscillator must also be considered novel.

Figure 1:
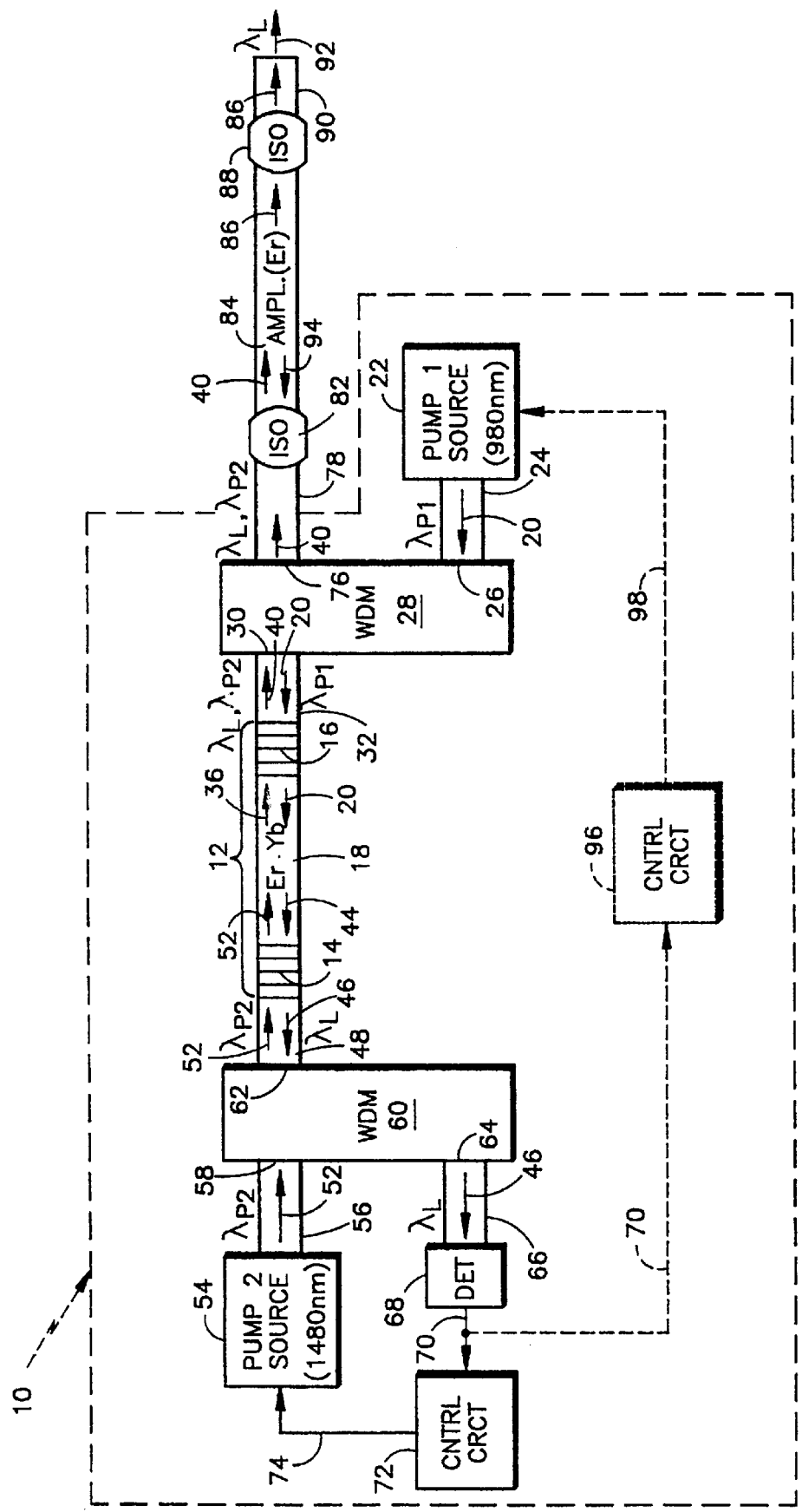
FIG. 1 is a schematic block diagram of a convention dual-wavelength pumped low noise fiber laser.
Figure 2:
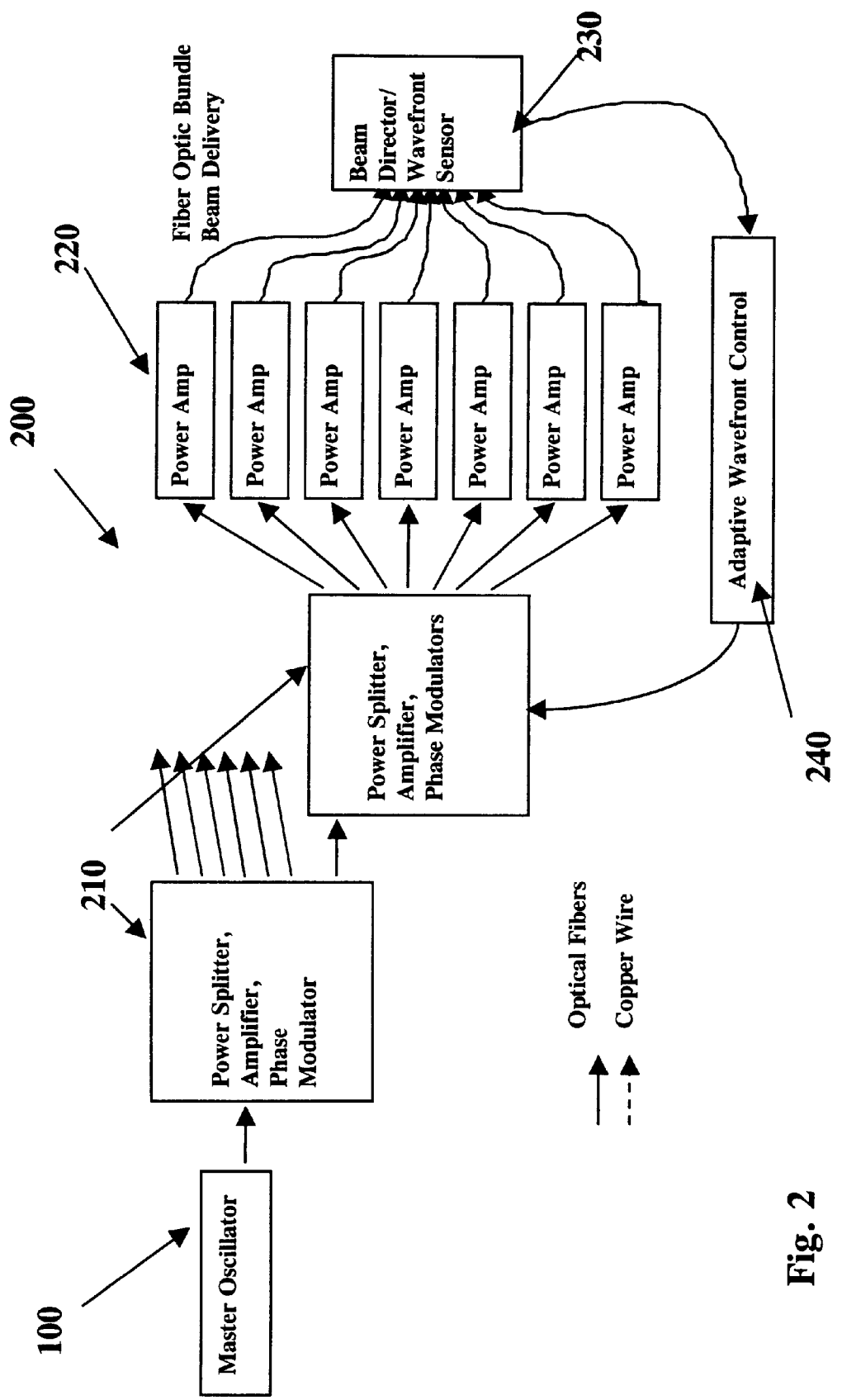
FIG. 2 is a high level block diagram of selected components of a previously proposed optical fiber laser amplifier array.

To understand the operation of the dual frequency phased array amplifier, refer first to the drawing in FIG. 2, which shows one proposed laser amplifier which has the requisite power output characteristic, i.e., the MO-PPAA laser system previously disclosed in commonly-assigned, copending U.S. application Ser. No. 08/782,175, which application was filed on Jan. 14, 1997, and which application is incorporated herein by reference for all purposes. As illustrated in FIG. 2, the MO-PPAA laser system includes a master oscillator (MO) 100 coupled to a fiber optic power amplifier 200. Preferably, MO 100 is a stable, very narrow linewidth laser, which can be operated in a $TEM_{00}$ mode at a frequency within the gain spectrum of the power amplifier 200 and which can be coupled by optical fiber to deliver a continuous wave signal to downstream components (not shown). Other types of master oscillators advantageously can be used, since the decisive condition is that the coherence length of the master oscillator exceed the maximum path length difference in the system.

It will be appreciated that the master oscillator 100 can be any conventional master oscillator laser, although the master oscillator is preferably a fiber laser oscillator. Some additional conventional components are understood to be part of any practical laser system, e.g., the MO-PPAA laser system, and have been omitted. For example, one of ordinary skill in this particular art would appreciate that an optical isolator would be located immediately downstream of the master oscillator 100 to prevent feedback from downstream components, e.g., power amplifier 200, that would induce instability in the master oscillator 100. The details of such components are well known to those skilled in the art and will not be discussed further.

Although a single fiber power amplifier 200 will suffice for some short range applications, a coherent array of optical fiber amplifiers collectively forming the fiber optic power amplifier 200 can be particularly advantageous for those specific applications requiring high output power. One such arrangement of a coherent phased array of fiber optic amplifiers generating high power laser beam is shown in FIG. 2, for example, as needed in long range ladar system applications. This particular laser power amplifier is also described in detail in copending, commonly assigned U.S. patent application Ser. Nos. 08/471,870 and 08/611,474, which applications are also incorporated herein by reference for all purposes.

It will be appreciated that the power splitter, amplifier and phase modulator elements 210 in FIG. 2 may be arranged in various configurations other than the exemplary arrangement illustrated in that Figure. The illustrated fiber optic power amplifier 200 of FIG. 2 includes a first stage composed of a first beam splitter element 210, for splitting a received laser beam into a number N of secondary laser beams. Each of the secondary laser beams is provided to a second beam splitter element 210, which produces a number M of tertiary laser beams from a respective one of the secondary laser beams. Each of the tertiary laser beams is amplified by a respective fiber power amplifier generally denoted 220. It should be mentioned that although two separate stages of beam splitter elements 210 and one amplifier stage 220 are depicted in FIG. 2, the fiber optic power amplifier 200 can have more or less amplification stages. For example, when the first and second beam splitter elements 210 include an optical amplifier 16 pumped by a pump source 18, a beam splitter 24 and, optionally, a number N×M of phase modulators, respectively, a total of three amplification devices are included in the power amplifier 200. See FIGS. 2 and 3A.

Figure 3C:
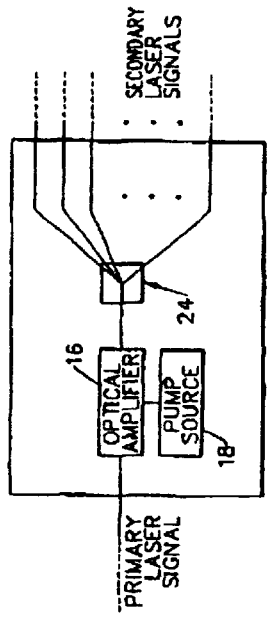
Figure 3B:
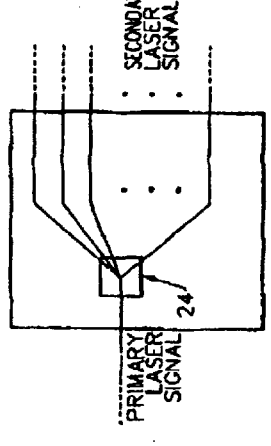

Moreover, alternative configurations are possible. For example, the number of series connected elements 210 can be any number greater than or equal to 2. Moreover, element 210 is not limited to the arrangement illustrated in FIG. 3A. For example, the first stage element 210 need not include either an amplifier 16 or a phase modulator 27 (FIG. 3B); alternatively, the first stage element 210 may include optical amplifier 16 but omit phase modulator 27 (FIG. 3C). Needless to say, additional amplifier stages can also be provided.

It will be noted that the fiber optic power amplifier 200 includes a phase modulator 27 in each optical path. These phase modulators 27 are provided to ensure that all of the N×M laser beams output by power amplifier 200 arrive at the output of the power amplifier 200 with a predetermined phase profile to minimize transmission losses as the radiated beam propagates toward the target. The power amplifier 200 thus includes a waveform sensor 230 in the output optical path. The waveform sensor 230 produces sensor signals which are provided to phase modulators 27 in element 210 via an adaptive waveform controller 240. Examples of the construction and operation of waveform sensor 230 and waveform controller 240 are provided in above-referenced copending, commonly assigned U.S. patent application Ser. Nos. 08/471,870 and 08/611,474.

Thus, in the system depicted in FIG. 2, the master oscillator 100 generates a signal at a low power level that is coupled into an optical fiber. The signal, which must be within the gain band of the rare earth dopant used in the system, is amplified and split among many fiber optic power amplifiers in power amplifier 200. Each stage of the power amplifier 200 amplifies the signal to a higher level and delivers it to a summing aperture with appropriate beam forming optics (not shown). The phase of the signal from each beam line is individually controlled to form a diffraction limited beam from the array. The master oscillator 100 defines the wavelength and waveform of the signal amplified and radiated by the MO-PPAA laser system, subject to the wavelength constraints mentioned previously and discussed immediately below.

It will be appreciated that nonlinear optical processes such as Stimulated Raman Scattering (SRS), i.e., a broad band effect whereby energy from the original wave is downshifted by 53 nm, nominally, into another forward-going wave, can rob power from a coherently amplified lightwave produced in power amplifier 200. SRS has a threshold-like behavior whereby, for a given fiber length, above a certain power level, significant energy is extracted from the coherently amplified wave into the scattered wave at a different wavelength. Below this threshold, the nonlinear process is not a problem. The SRS threshold for an exemplary 40 meter piece of optical fiber is approximately 100 Watts. It should be pointed out that the SRS process is highly nonlinear and thus very sensitive to small variations in parameters such as the mode size, fiber length and core dopants. Since the SRS is highly dependent on these parameters, it is feasible to increase the SRS threshold by increasing the mode diameter, and vice versa. Simulations show that small changes can result in significant increases or decreases in the SRS gain.

The master oscillator 100 signal is efficiently amplified by the array 200 of high power fiber optic amplifiers illustrated in FIG. 2 if no parasitic SRS occurs in the high power stages. This is assured by design of these amplifier stages. First, since the Raman gain is a function of the signal amplitude, the diameter of the fiber core can be increased within limits to reduce the intensity at a given signal power level. The limitation here is that the fiber should remain essentially single mode. Second, since the onset of the parasitic Raman signal is rather abrupt and depends on the level of down shifted Raman signal present, a Raman filter can be inserted between the series-connected stages of each power amplifier line to impede the build up of the Raman signal. It will be appreciated that the actual placement of one or more Raman filters is an exercise well within the skill of one of ordinary skill in the art and placement will not be discussed further.

It short, the MO-PPAA illustrated in FIG. 2 permits the applied master oscillator signal to be efficiently amplified by the array of high power fiber optic amplifiers, assuming no parasitic nonlinear effects occur in the high power stages. Moreover, the MO-PPAA consists of a phased array of high power fiber optic amplifiers that amplify a signal within the gain band of the single rare earth dopant used in the fiber amplifier core. This restricts the useful band of wavelengths to a few tens of nanometers for each of the limited number of rare earth dopants. Even though the output of such an array can be frequency doubled efficiently, the wavelength restriction mentioned immediately above applies equally to the possible harmonic wavelengths.

In contrast, the preferred embodiments according to the present invention employ two (or more) dopants to enable dual frequency operation of an amplifier or array. Although the discussion which follows will focus on the Yb:Er optical fiber combination discussed in U.S. Pat. No. 5,594,747, it will be appreciated that other co-doping schemes, e.g., Yb:Pr advantageously can be used. All amplifier arrays and oscillators incorporating co-doped optical fibers and operated responsive to first and second master oscillators, as discussed in greater detail below, are considered to be within the scope of the present invention.

As mentioned above, the primary reason for co-doping an optical fiber its that the doping ion with desirable emission wavelengths (called here the target ion) may have no pumping absorption bands at wavelengths for which efficient, reliable, and low cost laser diode pumps are available, whereas a second ion (called here the pumping ion) may have efficient pump absorption bands that match available pump diode wavelengths. When the absorbed pump energy can be transferred by a non-radiative cross-relaxation process from the second class of ion to the first, i.e., from the pumping ion to the target ion, co-doping both into a fiber may allow efficient operation at the target wavelength using readily available pump sources. Thus, the excited state of the pumping ion is merely a temporary storage site for energy which is ultimately transferred to the target ion and emitted as laser output signal within the target ion's gain band. It will be noted that the inevitable delay in the cross-relaxation process is not a serious issue in most co-doping applications.

Figure 6A:
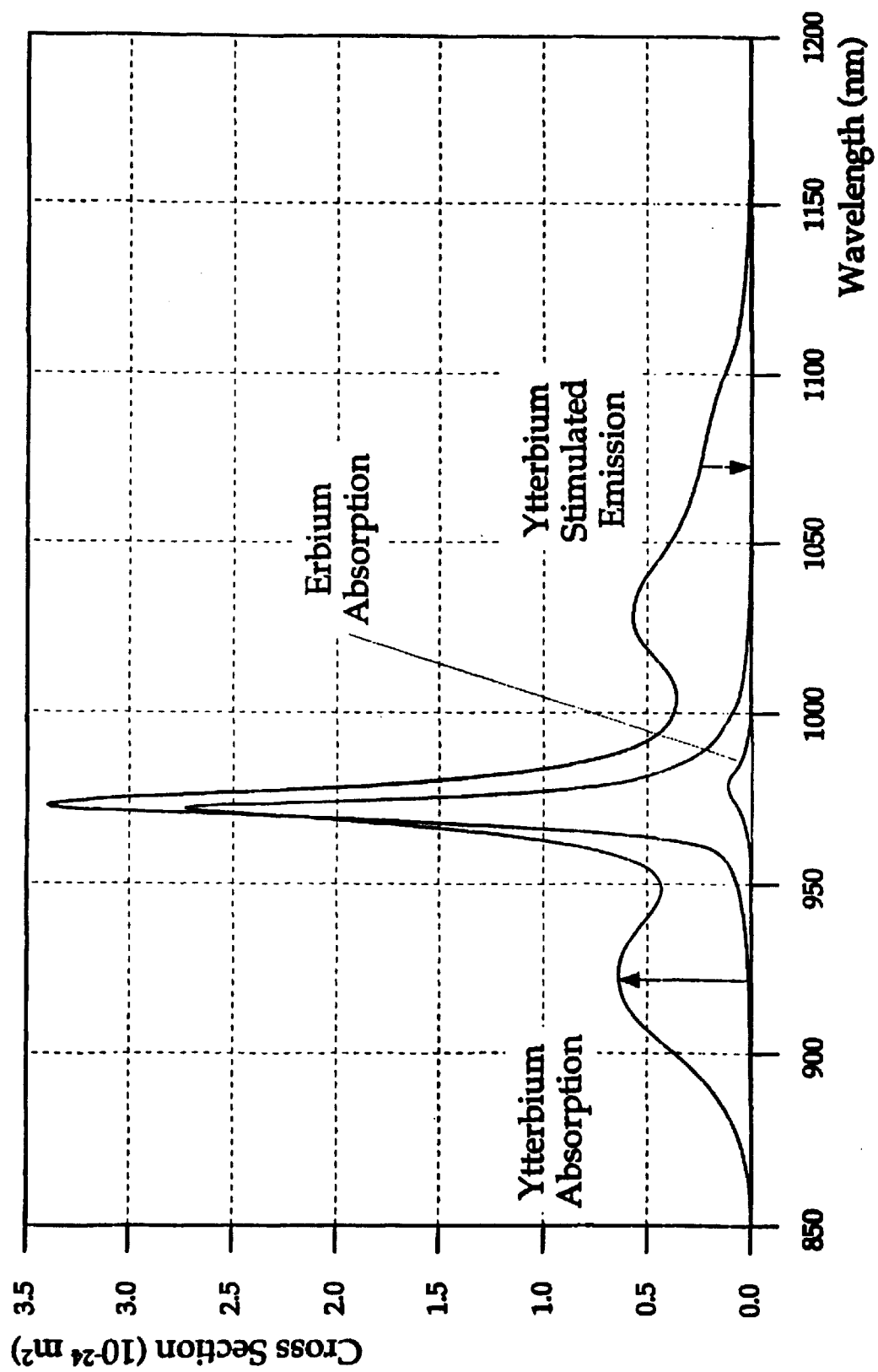
FIGS. 6A though 6F illustrate various graphs and representational diagrams which are useful in understanding the operating principles underlying the present invention.
Figure 6B:
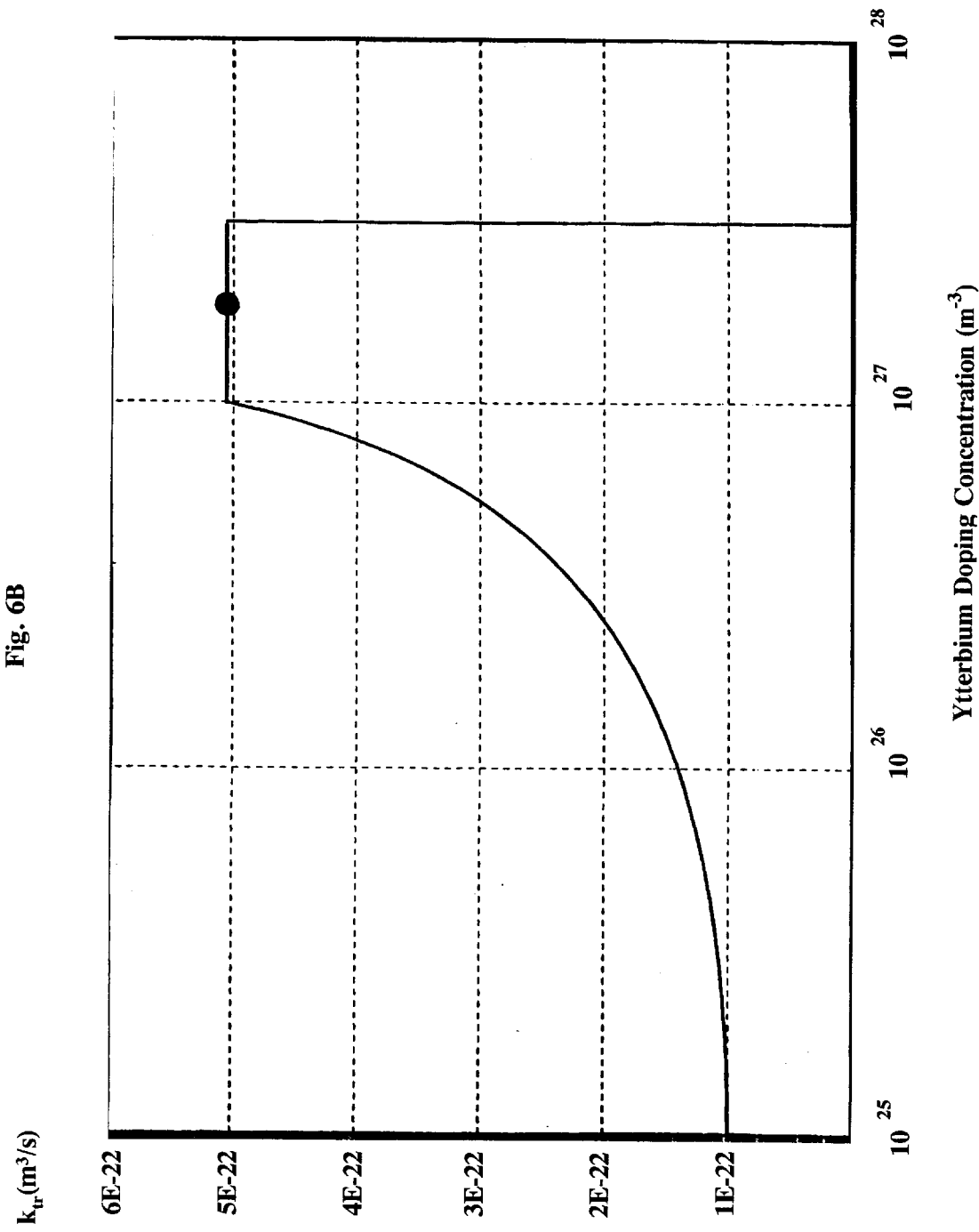
Figure 6C:
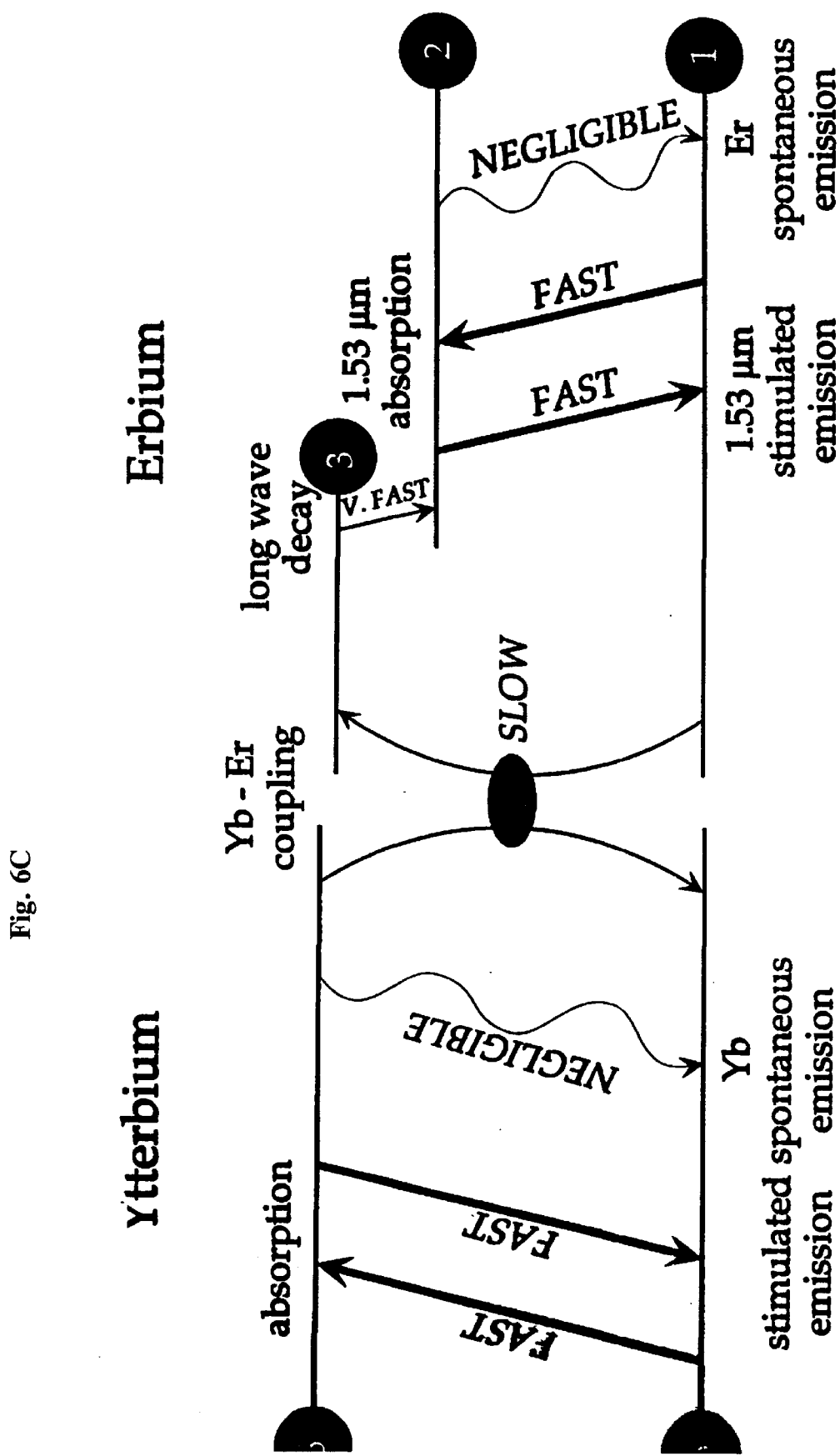
Figure 6E:
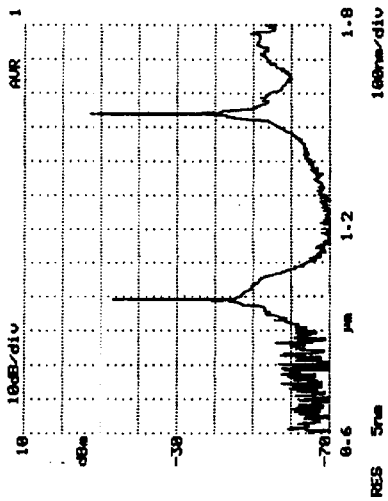
Figure 6D:
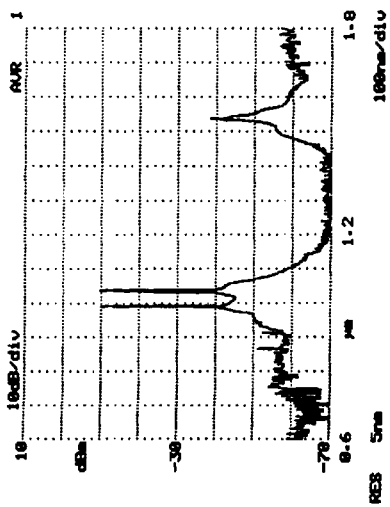
Figure 6F:
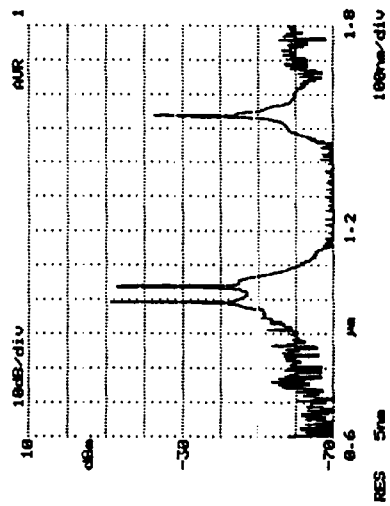

FIGS. 6A through 6F illustrate this mechanism more fully. FIG. 6A illustrates the absorption and stimulated emission cross-sections for Yb:Glass for both Yb and Er ions. FIG. 6B depicts a curve showing the Yb:Er transfer coefficient as a function of Yb doping concentration. FIG. 6C illustrates relaxation coupling of energy from the Yb pumping ion to the Er target ion. Moreover, FIGS. 6D through 6F illustrate the individual and composite gains, respectively, produced by the pumping and target ions.

Figure 4A:
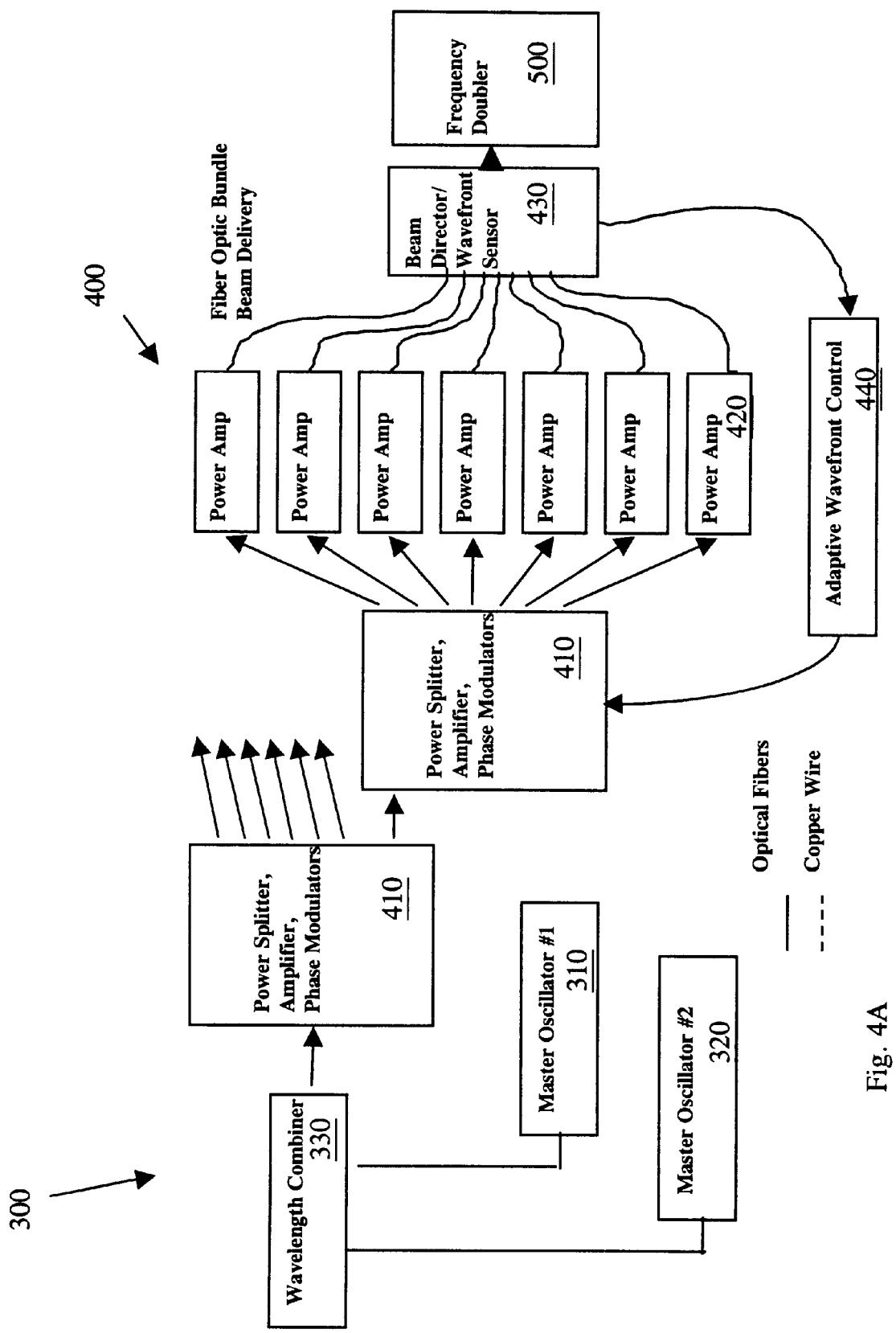
FIGS. 4A and 4B are high level block diagrams of a first preferred embodiment of an optical fiber laser amplifier array according to the present invention and an alternative arrangement of these components, respectively.
Figure 4B:
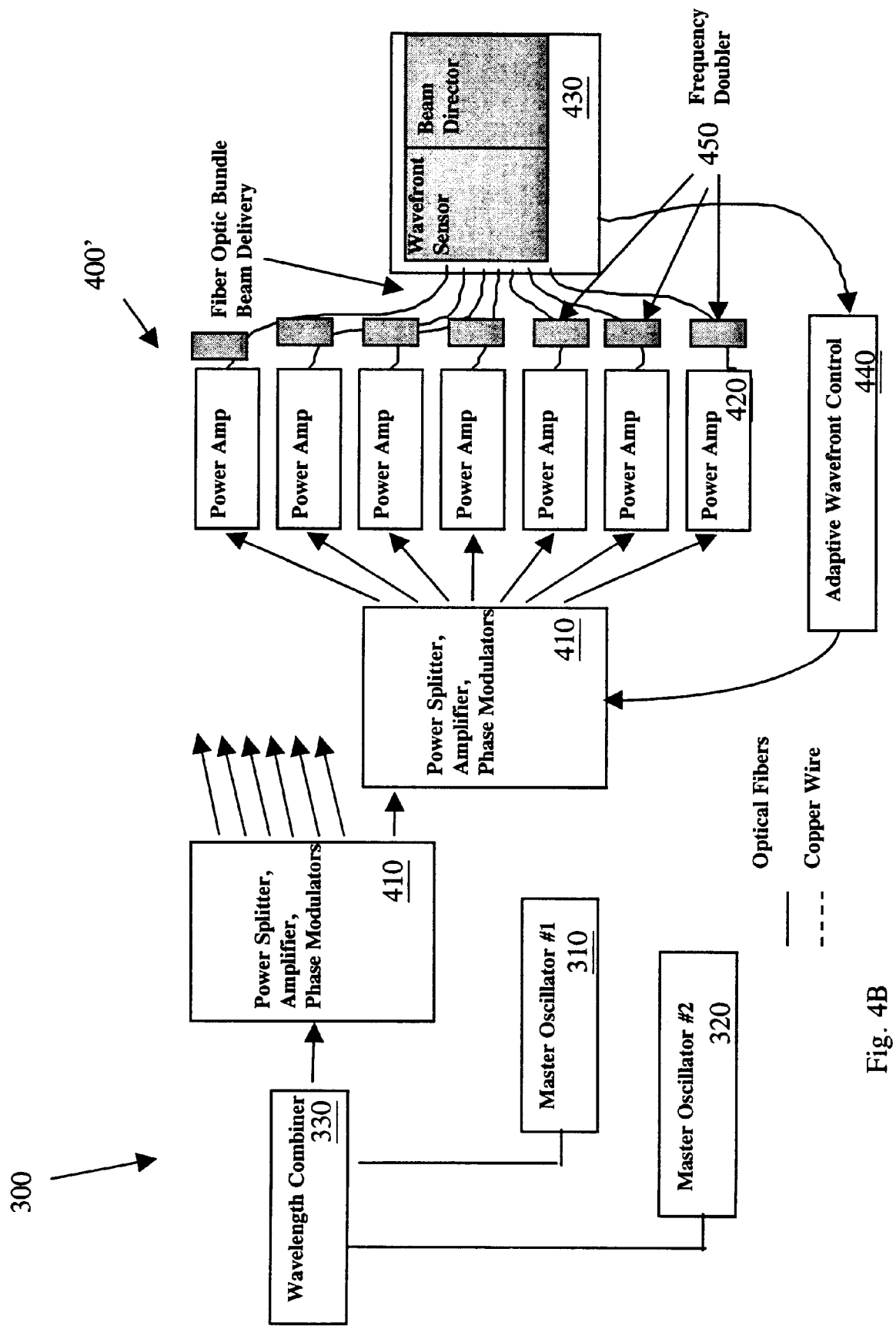

A preferred embodiment according to the present invention will now be described with reference to FIGS. 4A and 4B, wherein the dual frequency laser amplifier array includes a laser source generator 300, a laser amplifier array 400 and a frequency doubler 500. As will be appreciated from the discussion which follows, although the dual frequency laser amplifier array according to the present invention appears to be similar to that employed in a proposed phased array laser amplifier illustrated in FIG. 2, at first glance, the operation of the MO-PPAA array illustrated in FIG. 2 and the dual frequency laser amplifier array illustrated in FIGS. 4A and 4B are markedly different In the proposed system of FIG. 2, the output wavelength of the amplifier array stage 200 advantageously is determined by the output wavelength of the master oscillator. In contrast, in the preferred embodiment of the present invention illustrated, for example, in FIG. 4A, the percentage of total output power at the target and pumping ion wavelengths is determined by the relative power generated by the first and second master oscillators.

The dual frequency laser amplifier array according to a first preferred embodiment of the present invention is illustrated in FIG. 4A, wherein master oscillators advantageously can inject source laser beams at the pumping and target ion emission wavelengths into the amplifier array via a simple wavelength combiner. More specifically, the laser source generator 300 includes first and second master oscillators 310, 320, each generating a source laser beam at a wavelength corresponding to the gain frequency of a respective one of the rare earth dopant employed in the co-doped optical fibers used in construction of the amplifier array 400, and a wavelength combiner 330, for combining the first and second source laser beams generated by the first and second master oscillators 310, 320 for application to the amplifier array 400. It should be mentioned that the wavelength combiner 330 advantageously can be either an active or passive device; most preferably, the wavelength combiner 330 is a member of the class of devices generally denoted a wavelength division multiplexer (WDM). It should also be mentioned that the pump source laser beam generated by a pump source (not shown), e.g., a laser diode, advantageously can be applied to the wavelength combiner 330. Moreover, the radiated power level of the master oscillators 310, 320 advantageously can be controller by a controller (not shown), e.g., a computer or microprocessor, electrically coupled to the drive circuitry of both master oscillators.

The actual construction of the amplifier array 400 is substantially identical to the construction of the amplifier array 200, which was discussed with respect to FIGS. 2 through 3C, and which will not be discussed further for that reason unless otherwise noted. For example, it should be noted that, for maximum power output, the power amplifiers 420 are constructed from co-doped optical fiber.

The dual frequency laser amplifier array illustrated in FIG. 4B is similar to that illustrated in FIG. 4A but for replacement of the frequency doubler 500 with a plurality of frequency doubling elements 450. It will be appreciated that frequency doublers are typically nonlinear crystals which may be power limited; the amplifier array 400 advantageously permits placement of the frequency doublers in positions where the maximum power handling capacity of each frequency doubler is not exceeded. In other words, the desired output laser beam can be frequency doubled either by a single nonlinear crystal 500 depicted in FIG. 4A, or by an array of nonlinear crystals, generally denoted 450, located immediately downstream of the power amplifiers 420. It will be appreciated that the configuration of FIG. 4B is particularly advantageous for very high average power applications.

Advantageously, as illustrated in FIG. 4A, the device 500 can be selected from one of a frequency doubling device, i.e., a second harmonic generator (SHG), or by arithmetic combines, e.g. a sum frequency generator (SFG) or a difference frequency generator (DFG). Given the significant gain band widths for typical pumping and target ions, a wide range of output wavelengths beneficially can be generated.

Figure 3A:
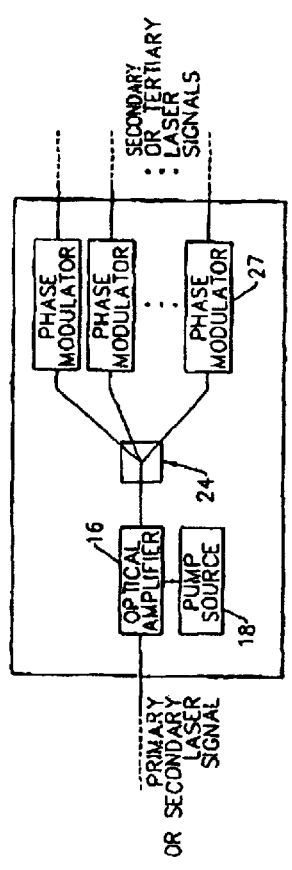
Figure 3D:
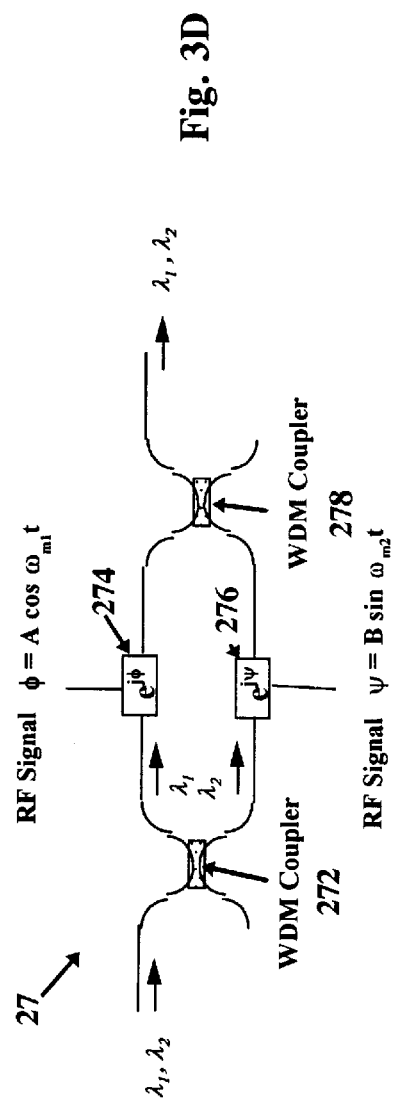
FIG. 3D illustrates one exemplary arrangement of the phase modulators elements illustrated in FIG. 3A.
Figure 5:
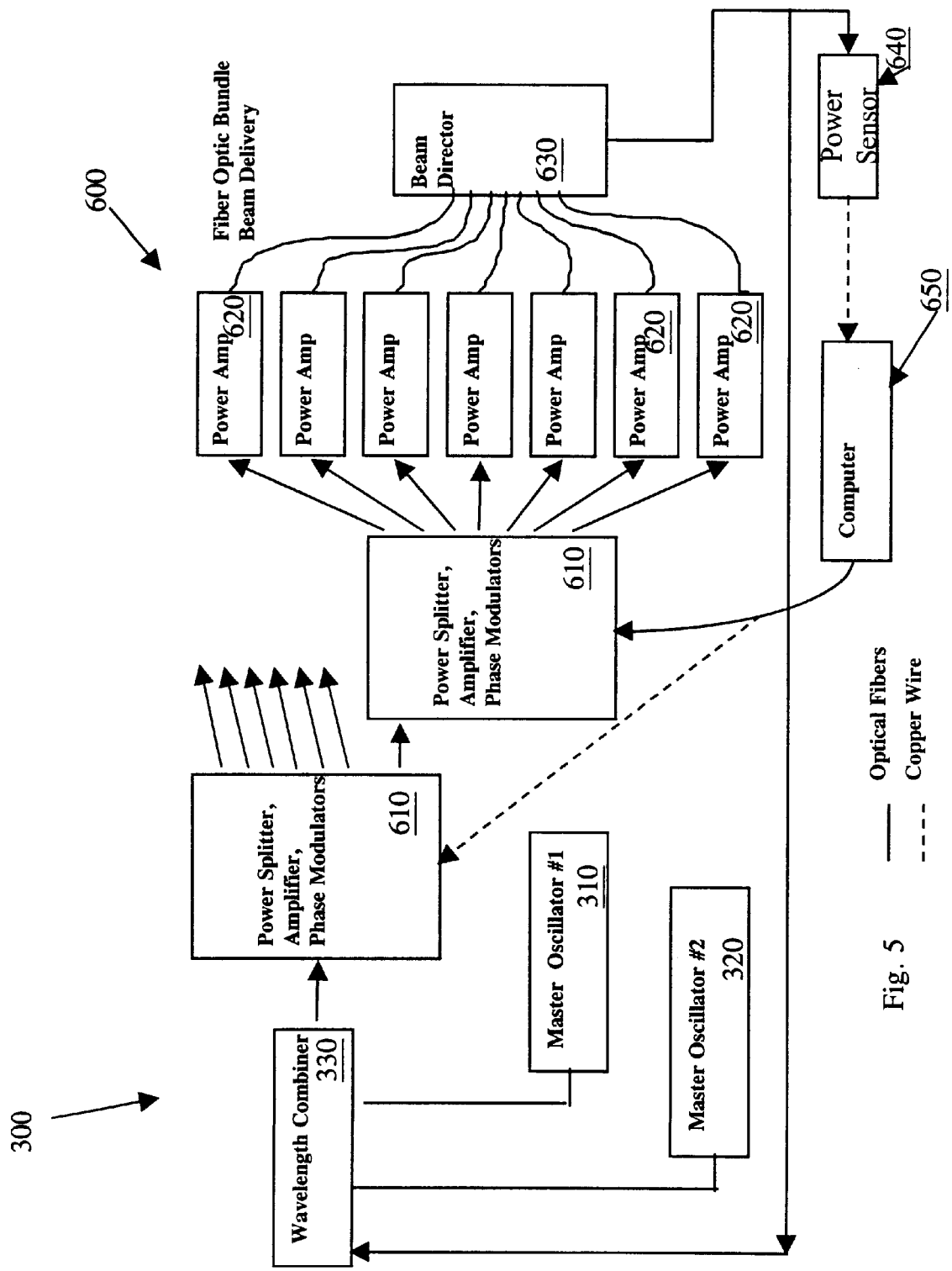
FIG. 5 is a high level block diagram of a second preferred embodiment of an optical fiber laser oscillator according to the present invention.

It will appreciated that the dual frequency laser amplifier array illustrated in FIGS. 4A and 4B can be adapted to form a laser oscillator, as illustrated in FIG. 5, including the laser source generator 300 and a laser amplifier array 600, which is both feedforward and feedback coupled to the laser source generator 300. Advantageously, elements 610 and 620 are substantially similar to corresponding elements 410 and 420; thus, additional details regarding elements 610 and 620 will not be provided in the interest of brevity. It will also be appreciated that the beam director and wavefront sensor 430 of FIGS. 4A and 4B advantageously can be replaced by the beam director 630 of FIG. 5 when the desired output beam is a single mode beam, i.e., when the oscillator functions as a spatial filter. In that case, the radiated power collected by beam director 630 is sampled by power sensor 640, which provides a control signal indicative of total radiated power to computer 450. Computer 450, in turn, employs one of the well known "hill climbing" or "multi-dither" algorithms to control each of the power splitter, amplifier and phase modulator elements 610 so that a single phase front is delivered to beam director 630 and so that the maximum possible radiated power is delivered from beam director 630 as a single mode output beam. It will be appreciated that the phase modulator elements advantageously can be constructed as illustrated in FIG. 3A, where each of the individual phase modulators 27 preferably is constructed as illustrated in FIG. 3D. The phase modulator 27, in an exemplary case, includes first and second WDM couplers 272 and 278, which are optically connected to phase adjustors 274, 276, the latter being disposed in parallel to one another. It will be appreciated that the electro-optic circuit illustrated in FIG. 3D permits control signals generated by computer 650 to phase adjust laser beams having first and second wavelengths.

In the preferred embodiments according to the present invention, the finite rate of the cross-relaxation process illustrated in FIG. 6C results in the buildup of a significant excited population of the pumping ion, which results in the existence of gain within the pumping ion's emission band. This excited pumping ion population, because of amplified spontaneous emission at the pumping ion's emission wavelength, represents a loss mechanism that is usually minor for amplifier operation within the target ion gain band. When a strong signal at the target ion's emission wavelength is injected into the amplifier, efficient amplification at the target ion wavelength is obtained. When, however, a strong input signal is injected into the amplifier within the pumping ion's gain band, the excited state population of the pumping ion can be driven down, even to the point that the total non-radiative cross-relation rate is insignificant, and gain at the target ion's emission wavelength is very small. Under these circumstances, essentially all of the pumping energy is recovered at the pumping ion's emission wavelength. Thus, by injecting appropriately power balanced signals at both the pumping and target ion emission wavelengths, amplification at both wavelengths can be obtained simultaneously.

While the present invention was discussed with respect to a single optical fiber type, the present invention is not limited to a single optical fiber type. The present invention works for any rare earth dopant pairs where an adequate cross-relaxation rate can be obtained. Preferably, the rare earth doped optical fiber can be fabricated using combinations of Nd, Yb, Er, Pr, Tm, and Ho as the composite dopant. Other dopants advantageously can include appropriate divalent ions producing color centers and disbursed semiconductor nanocrystals. For exemplary case under discussion, by employing Yb:Pr optical fiber, emissions at both 1 $\mu$m and 1.3 $\mu$m are practical. It will be appreciated that up conversion radiation in the red, blue and green has been observed and laser action has been obtained using this co-doping scheme. With deep saturation of an amplifier array constructed from Yb:Pr co-doped fiber by the three color wavelengths along with resonant pumping, efficiency and power in the visible far beyond any reported to date advantageously can be obtained. It will be noted that such a source would be ideal for laser projectors.

In other applications, the capability to generate a wide range of wavelengths as noted above would enable mid-infrared signal generation with high quantum efficiency. For example, the difference signal between 1 $\mu$m and 1.3 $\mu$m obtained from an Yb:Pr fiber would be at about 3 $\mu$m, which wavelength is highly useful for infrared countermeasures, whereas the frequency doubled sum signal wavelength will be approximately 589 nm, as required for artificial laser guide star applications. Uranium isotope separation requires 572 nm in one Atomic Vapor Laser Isotope Separation (AVLIS) scheme, which advantageously can be achieved by SFG in this system.

In summary, the preferred embodiment according to the present invention is a dual frequency laser amplifier array composed of all solid state elements. The present invention has many desirable features, such as modularity, high power, high efficiency, wavelength diversity, making the dual frequency laser amplifier array desirable over other laser systems having similar selectable operating frequencies.

It should be mentioned that the beam director and wavefront sensor 430 illustrated in FIG. 4A, for example, is more complex than a comparable single wavelength system since a precise value for phase shift at both of two wavelengths must be generated. This can be accomplished by a dispersive phase modulator, which is disclosed in Serial No. (Atty. Docket No. D4089A). This disclosure is incorporated herein by references. In the simplest exemplary case, the dispersive phase modulator includes a WDM device and associated sensors generating first and second electrical signals indicative of the output target and pump laser beams. The adaptive wavefront controller 440 generates first and second control signals for driving respective first and second electrically operated phase shift elements included in the phase modulators 27 illustrated in FIG. 3A.

It should also be mentioned that an indirect proof-of-concept demonstration was initially conducted using a diode pumped Yb:Er fiber. In order to demonstrate the principal that adequate gain plus a feedback mechanism results in laser oscillation, an experimental device was fabricated in which feedback could be selectively provided at either 1 $\mu$m or 1.5 $\mu$m, respectively, i.e., the pump ion and target ion emission wavelengths for this system. It was expected that laser oscillation at 1 $\mu$m would reduce the Yb ion lifetime and hence reduce the rate of excitation transfer to Er by cross-relaxation, thus reducing the gain to thereby either stop or reduce the level of laser oscillation at 1.5 $\mu$m. The results of that experiment confirmed that the onset of laser oscillation at 1 $\mu$m did indeed reduce or quench laser oscillation at 1.5 $\mu$m in a controllable way. Thus, the capability to achieve dual frequency operation of an amplifier, i.e., injecting a strong 1 $\mu$m signal to quench gain at 1.5 $\mu$m and thereby extract the available output power at the pump ion emission wavelength, was proven and model predictions verified. See FIGS. 6D–6F.

In summary, the energy transfer process from excited Yb to Er ions was modeled and was found to support efficient operation of Yb:Er fiber amplifiers at either wavelength under appropriate drive conditions. Specifically, the transfer of excitation from Yb to Er proceeds at a finite rate, which likely results from the requirement to emit multiple phonons in the cross-relaxation process. If nothing interrupts this process, the excited Er population builds up and supports efficient amplification at 1.55 $\mu$m. This mode of operation of Yb:Er fibers has been exploited for telecommunications amplifier applications. What has been overlooked is the fact that a strong optical signal in the wavelength range from 1030 nm to 1100 nm can drastically shorten the mean life time of the excited Yb ions so that very little of the absorbed pump energy is transferred to excited Er ions. Hence, the fiber amplifier array constructed of co-doped Yb:Er optical fibers advantageously can be induced to amplify a 1.06 $\mu$m signal efficiently while reducing the gain at 1.5 $\mu$m. It is simply necessary to make the stimulated emission rate of the excited Yb ions much greater than the Yb:Er cross-relaxation rate, a situation which only happens for large signal amplifiers, e.g., laser amplifiers commonly associated with military applications such as laser weapons, illuminators or ladars. This regime of operation has not heretofore been reported or explored.

It will be appreciated that since the pump photons are at a wavelength of 925 nm and amplifier output occurs at either 1.06 $\mu$m or 1.55 $\mu$m, energy is lost in either case; however, a given amplifier operated at 1 $\mu$m will obviously be 1.5 times more efficient than when it is operated at 1.5 $\mu$m. Hence, were output power and system efficiency the only issues, a Yb singly doped fiber operating at 1 $\mu$m would be the obvious choice. However, the 1.5 $\mu$m wavelength is more eyesafe than 1 $\mu$m wavelength by many orders of magnitude, so some function will require this band. The fundamental advantage of the dual frequency laser amplifier array is that the same array can be operated at the short wavelength with high efficiency for any application that requires high power or efficiency, but can be readily switched to the longer eyesafe wavelength by merely changing the input master oscillator wavelength. This has major advantages, since common components can be used for multi-band, multi-functional systems.

From the discussion immediately above, it will be appreciated that laser beams in eyesafe wavelengths, i.e., $\geq 1.3$ $\mu$m, advantageously can be preferentially output by controlling the relative signal strengths of the first and second source laser beams. Moreover, the dual frequency laser amplifier array advantageously can be locked into an eyesafe operating mode by physically decoupling the first master oscillator 310 from the wavelength combiner 330.

From the discussion above, it will also be appreciated that a high power fiber optic laser technology (HPFOL) system can be scaled to weapon levels, e.g., 400 kW for tactical high energy laser (THEL) systems and 2–4 MW for airborne laser (ABL) systems. This technology is based on phased arrays of laser diode pumped high power fiber amplifiers driven by a common master oscillator, such as disclosed in the commonly assigned applications discussed above. Thus, either version of the HPFOL weapon system will emit lethal power in the highly efficient, but non-eyesafe 1 $\mu$m wavelength band, because the cost of generating hundreds of kW at eyesafe wavelengths would be prohibitively expensive. Moreover, the propagation through the atmosphere is very favorable, if not optimum, in the 1 μm band. It would be highly advantageous to also be able to operate the array at the eyesafe 1.5 μm wavelength band to function as a ladar for non-cooperative target classification at sub-lethal power levels. The dual frequency laser amplifier array is excellent for this purpose, enabling major system savings and providing competitive advantage over other laser amplifier types. Moreover, the capability to operate the weapon system at 1.5 μm, even at reduced efficiency and power, will enable live fire training and wavelength diversity in an attack mode. Furthermore, there is a strong movement in the military to seek multi-band, multi-functional laser hardware wherever possible; the dual frequency laser amplifier array disclosed herein is consistent with this policy.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A dual frequency laser amplifier comprising:
    a beam generator for generating first and second source laser beams; and
    a co-doped optical fiber including first and second ions having first and second gain bandwidths corresponding to the respective wavelengths of said first and second source laser beams for selectively forming first and second diffraction limited output laser beams responsive to the relative radiated power between said first and second source laser beams.

2. The dual frequency laser amplifier as recited in claim 1, wherein said beam generator comprises:
    a first master oscillator for producing said first source laser beam at said first wavelength;
    a second master oscillator for producing said second source laser beam at said second wavelength; and
    a wavelength combiner for combining and applying said first and second source laser beams to said co-doped optical fiber.

3. The dual frequency laser amplifier as recited in claim 1, wherein said dual frequency laser amplifier is a dual frequency laser amplifier array and wherein said co-doped optical fiber comprises a plurality of co-doped optical fiber sections disposed in an array.

4. The dual frequency laser amplifier as recited in claim 1, further comprising a frequency doubler for doubling the frequency of the selected one of said first and second diffraction limited output laser beams so as to produce a corresponding frequency doubled diffraction limited output laser beam.

5. The dual frequency laser amplifier as recited in claim 1, further comprising a frequency doubler for doubling the frequency of said first and second diffraction limited output laser beams so as to produce first and second frequency doubled diffraction limited output laser beams.

6. The dual frequency laser amplifier as recited in claim 5, wherein said dual frequency laser amplifier is a dual frequency laser amplifier array, and wherein said co-doped optical fiber comprises a plurality of co-doped optical fiber sections disposed in an array, said array comprising:
    a beam splitter receiving said first and second source laser beams and generating N first and N second split laser beams at said first and second frequencies, respectively;
    N of said co-doped optical fiber sections disposed in parallel with one another, each of said optical fiber sections amplifying respective ones of said N first and said N second split laser beams to thereby produce N amplified first laser beams and N amplified second laser beams; and
    an optical combiner for receiving said N amplified first and said N amplified second laser beams to thereby generate said selected ones of said diffraction limited output laser beams;
    wherein N is an integer greater than or equal to 2.

7. The dual frequency laser amplifier as recited in claim 6, wherein said N of said co-doped optical fiber sections are connected to said optical combiner by a fiber optic bundle.

8. The dual frequency laser amplifier as recited in claim 6, wherein each of said optical fiber sections comprises a co-doped single mode optical fiber core, and wherein at least two dopants included in said optical fiber core are selected from a group consisting of Nd, Yb, Er, Pr, Tm, and Ho.

9. The dual frequency laser amplifier as recited in claim 1, wherein said co-doped optical fiber comprises Yb:Er optical fiber.

10. The dual frequency laser amplifier as recited in claim 1, wherein said co-doped optical fiber comprises Yb:Pr optical fiber.

11. A dual frequency laser amplifier comprising:
    first means for generating a first source laser beam at a first wavelength;
    second means for generating a second source laser beam at a second frequency;
    third means receiving said first and said second source laser beams for combining said first and second source laser beams to thereby generate a combined laser beam;
    fourth means operatively coupled to said third means for generating N first source laser beams and for generating N second source laser beams responsive to said combined laser beam;
    fifth means for amplifying the power level of each of said N first source laser beams and said N second source laser beams to thereby produce N first amplified laser beans and N second amplified laser beams, said fifth means including at least one section of co-doped optical fiber; and
    sixth means for combining said first and second N amplified laser beams to thereby produce a diffraction limited output laser beam, wherein the radiated power distribution between said first and said second wavelengths in said diffraction limited output laser beam reflects the relative radiated power between said first and said second source laser beams;
    where N is an integer greater than 1.

12. The dual frequency laser amplifier as recited in claim 11, wherein said sixth means comprises:
    seventh means for doubling the frequency of each of said N first amplified laser beams and said N second amplified laser beams so as to produce 2×N frequency doubled laser beams; and
    eighth means for combining said 2×N frequency doubled laser beams to thereby produce said diffraction limited output laser beam.

13. The dual frequency laser amplifier as recited in claim 12, wherein said co-doped optical fiber comprises Yb:Er optical fiber.

14. The dual frequency laser amplifier as recited in claim 12, wherein said co-doped optical fiber comprises Yb:Pr optical fiber.

15. The dual frequency laser amplifier as recited in claim 11, wherein said optical fiber section comprises a co-doped single mode optical fiber core, and wherein at least two dopants included in said optical fiber core are selected from a group consisting of Nd, Yb, Er, Pr, Tm, and Ho.

16. A method for operating a dual frequency laser amplifier having a beam generator for generating first and second source laser beams, and a co-doped optical fiber including first and second ions having first and second gain bandwidths corresponding to the respective wavelengths of said first and second source laser beams for selectively forming first and second diffraction limited output laser beams, the method comprising the steps of:

applying only said first source laser beams to the co-doped optical fiber to thereby generate only said first diffraction limited laser beam;

applying only said second source laser beams to the co-doped optical fiber to thereby generate only said second diffraction limited laser beam; and simultaneously applying said first and said second source laser beams to the co-doped optical fiber to thereby simultaneously generate said first and second diffraction limited output laser beams, wherein the radiated power of said first and second diffraction limited output laser beams is determined by the relative radiated power between said first and second source laser beams.

17. The method for operating the dual frequency laser amplifier as recited in claim 16, wherein said co-doped optical fiber comprises Yb:Er optical fiber.

18. The method for operating the dual frequency laser amplifier as recited in claim 16, wherein said co-doped optical fiber comprises Yb:Pr optical fiber.

19. The method for operating the dual frequency laser amplifier as recited in claim 16, further comprising a step for doubling the frequency of said first and second diffraction limited output laser beams to thereby produce a frequency doubled diffraction limited output laser beam.

20. The method for operating the dual frequency laser amplifier as recited in claim 16, further comprising a step for arithmetically processing said first and second diffraction limited output laser beams to thereby generate a resultant laser beam having a wavelength different from that of both said first and said second wavelengths.

21. A dual frequency laser oscillator comprising:

a beam generator for generating first and second source laser beams; and a co-doped optical fiber including first and second ions having first and second gain bandwidths corresponding to the respective wavelengths of said first and second source laser beams for selectively forming first and second diffraction limited output laser beams responsive to the relative radiated power between said first and second source laser beams;

wherein said beam generator and said co-doped optical fiber are both feedforward and feedback coupled to one another.

22. The dual frequency laser oscillator as recited in claim 21, wherein said beam generator comprises:

a first master oscillator for producing said first source laser beam at said first wavelength;

a second master oscillator for producing said second source laser beam at said second wavelength; and a wavelength combiner for combining and applying said first and second source laser beams to said co-doped optical fiber and receiving a predetermined portion of said first and second diffraction limited output laser beams.

23. The dual frequency laser oscillator as recited in claim 21, further comprising a frequency doubler for doubling the frequency of the selected one of said first and second diffraction limited output laser beams so as to produce a corresponding frequency doubled diffraction limited output laser beam.

24. The dual frequency laser oscillator as recited in claim 21, wherein said co-doped optical fiber comprises Yb:Er optical fiber.

25. The dual frequency laser oscillator as recited in claim 21, wherein said co-doped optical fiber comprises Yb:Pr optical fiber.

* * * * *